United States Patent
Ramezani (10) Patent No.: US 12,395,035 B1
(45) Date of Patent: Aug. 19, 2025

(54) SEALED MOTOR

(71) Applicant: Milwaukee Electronics Corporation, Milwaukee, WI (US)

(72) Inventor: Kamran Ramezani, Sanford, FL (US)

(73) Assignee: Milwaukee Electronics Corporation, Milwaukee, WI (US)

( * ) Notice: Subject to any disclaimer, the term of this patent is extended or adjusted under 35 U.S.C. 154(b) by 295 days.

(21) Appl. No.: 18/116,462

(22) Filed: Mar. 2, 2023

Related U.S. Application Data (60) Provisional application No. 63/341,043, filed on May 12, 2022.

(51) Int. Cl.
  *H02K 5/10* (2006.01)
  *H02K 5/15* (2006.01)
  *H02K 7/08* (2006.01)

(52) U.S. Cl.
  CPC .......... *H02K 5/10* (2013.01); *H02K 5/15* (2013.01); *H02K 7/085* (2013.01)

(58) Field of Classification Search
  CPC .......... H02K 5/10; H02K 5/15; H02K 7/085
  USPC .................................................... 310/89
  See application file for complete search history.

(56) References Cited

U.S. PATENT DOCUMENTS

| | | |
|---|---|---|
| 2,418,194 A | 4/1947 | Piccardo |
| 4,272,084 A | 6/1981 | Martinson et al. |
| 5,442,248 A * | 8/1995 | Agnoff .................. H02K 7/1012 310/67 R |
| 5,558,341 A | 9/1996 | McNickle et al. |
| 2006/0119197 A1* | 6/2006 | Puterbaugh .............. H02K 5/10 310/43 |

FOREIGN PATENT DOCUMENTS

| | | | | |
|---|---|---|---|---|
| CA | 1160906 A | * | 1/1984 | .............. F04C 15/00 |
| CN | 202001324 U | * | 10/2011 | ........... E04H 12/085 |
| CN | 102363466 A | * | 2/2012 | |
| DE | 102013000266 A1 | * | 7/2014 | ............... B25F 5/02 |
| DE | 102018123909 A1 | * | 4/2020 | ............. F04D 13/06 |

* cited by examiner

*Primary Examiner* — Jose A Gonzalez Quinones
(74) *Attorney, Agent, or Firm* — Wong Meyer Smith & McConnell (57) ABSTRACT

A motor includes a motor housing; motor stators including motor windings; a shaft connected to the motor stators, the shaft extending along a longitudinal axis of the motor; and a motor rotor including: a rotor; magnets located within the rotor or motor windings located within the rotor; and bearings located between the motor housing and the shaft so that the motor housing and the shaft are movable relative to each other. The bearings comprise: an interior side that faces an interior of the motor; an exterior side that faces a location outside of the motor and all or portion of the exterior side is free of being covered by the motor housing; a hydrophobic material filling a gap created by a region that is free of being covered by the motor housing; and a shaft seal located on the interior side of one of the one or more bearings.

18 Claims, 4 Drawing Sheets

SEALED MOTOR

CROSS-REFERENCE TO RELATED APPLICATIONS

This application claims the benefit of U.S. provisional patent application Ser. No. 63/341,043 filed May 12, 2022 the entire disclosure and content of which is hereby incorporated by reference.

FIELD

The present teachings generally relate to a motor that includes one or more magnets that may be produced using high energy product magnet material. The ends of the motor may be sealed to prevent fluid penetration into the motor.

BACKGROUND

Motors are used in a variety of applications, some of which involve exposure to fluids. In such applications, it would be attractive to have a motor that is resistant to fluid. What is needed is a seal, a sealant, or both that prevents fluid from entering the motor. It would be attractive to have a groove within the seal bearing housing to receive the seal. What is needed is a seal, a sealant, or both that is located between the rotor of the motor and the and the bearing. It would be attractive to have a seal that is lubricated by the bearing so that the seal prevents fluid from entering the motor.

SUMMARY

The present teachings relate to a sealed motor without a gearbox. The motor may be a sealed brushless DC motor. The motor may have an internal rotating member. The motor may be used in virtually any environment where the motor is exposed to water, wash down, liquids, high humidity, submerged, or a combination thereof.

The present teachings meet one or more of the present needs by providing: a motor comprising: (a) a motor housing; (b) one or more motor stators including a plurality of motor windings; (c) a shaft connected to the one or more motor stators, the shaft extending along a longitudinal axis of the motor; and (d) a motor rotor including: (i) a rotor; (ii) one or more magnets located within the rotor or motor windings located within the rotor; (e) one or more bearings located between the motor housing and the shaft so that the motor housing and the shaft are movable relative to each other, wherein one of the one or more bearings comprises: (i) an interior side that faces an interior of the motor; (ii) an exterior side that faces a location outside of the motor and all or portion of the exterior side is free of being covered by the motor housing; (iii) a hydrophobic material filling a gap created by a region that is free of being covered by the motor housing; and (f) a shaft seal located on the interior side of one of the one or more bearings.

The present teachings provide: a motor comprising: (a) a motor housing; (b) one or more motor stators including a plurality of motor windings; (c) a shaft connected to the one or more motor stators, the shaft extending along a longitudinal axis of the motor; and (d) a motor rotor including: (i) a rotor; (ii) one or more magnets located within the rotor; (iii) one or more bearings located between the motor housing and the shaft so that the motor housing and the shaft are movable relative to each other; (e) one or more guards located on an external side of the one or more bearings; and (f) a shaft seal located on the interior side of one of the one or more bearings.

The present teachings provide a motor that is resistant to fluid, which may be connected to a roller. The present teachings provide a seal, a sealant, or both that prevents fluid from entering the roller, motor, or both. The present teachings provide a groove within the seal bearing housing to receive the seal. The present teachings provide a seal, a sealant, or both that is located between the rotor and the and the bearing. The present teachings provide a seal that is lubricated by the bearing so that the seal prevents fluid from entering the motor.

A motor in accordance with the present teachings may be used, for example, in a conveyor system having a motor within one or more of the rollers or a motor that is suspended from the conveyor frame that rotates one or more of the rollers. The one or more rotated rollers may be coupled to other rollers so that multiple rollers are driven by a motor. Using a motor in accordance with the present teachings is especially useful in a conveyor system that needs to be washed down for special material handling such as food processing.

Other aspects, features and advantages of the invention will become apparent to those skilled in the art from the following detailed description and accompanying drawings. It should be understood, however, that the detailed description and specific examples, while indicating certain embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements can be several views, and in which.

In describing the embodiments of the invention which are illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected," "attached," or terms similar thereto are often used. They are not limited to direct connection or attachment, but include connection or attachment to other elements where such connection or attachment is recognized as being equivalent by those skilled in the art.

DETAILED DESCRIPTION

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a sealed motor that may be connected to a machine for imparting rotation to a component of the machine. The machine may be any machine, and which may include a frame that supports the motor. The machine may be, for example, a conveyor, a machine used to form or smooth a material, such a calendar for pressing paper, a printing press, a drum used for driving a belt such as in a mining application, or a treadmill.

The motor may run from an alternating current (AC) source or from a direct current (DC) source. The motor may be a brushless motor, and may be a direct current brushless motor (e.g., brushless DC motor). The motor may include a motor shaft, shaft cover, bushing, motor cover, wires, controller, motor stator, magnets, motor rotor, motor hub, motor windings, motor housing, end cap, guard, hydrophobic material, or a combination thereof. The motor may be free of contact with and/or free of a gear box. For example, the motor shaft may directly drive a primary roller so that intervening gear boxes are not needed to rotate all or a portion of the primary roller. In another example, the motor, the roller, or both may be free of gear boxes and a motor shaft of the motor may directly drive an object.

The motor shaft functions to rotate objects such as a roller. The motor shaft may extend through a frame into contact with an object to be rotated such as a roller. The motor shaft may directly contact an object. The motor shaft may indirectly contact an object. The motor shaft may extend only from a single side of the motor. The motor shaft may extend from a first side and a second side of the motor. The motor, motor shaft, or both may be exposed to fluids, dust, debris, food, or a combination thereof. The motor, motor shaft, or both and corresponding machine may be cleaned or subjected to fluids for cleaning. The motor shaft may include one or more notches to prevent fluid from entering the motor.

The one or more notches may prevent fluid from extending along the motor shaft into the motor. The one or more notches may reduce surface tension of a fluid so that the fluid falls off of the shaft. The one or more notches may be located proximate to a fluid seal, a sealant, or both and the fluid seal, the sealant, or both may wipe the fluid off as the fluid exits the notch. The one or more notches may be a groove or ring in the motor shaft. The groove may have a cross-sectional shape that is "U" shaped, "V" shaped, "W" shaped, square shaped, or a combination thereof. The notches may be located outside of the motor. The notches may be located between the motor and the roller. The motor may include one or more controllers and the notches may prevent fluid from penetrating into the motor (e.g., into contact with electrical components of the motor such as the stator or rotor).

The one or more motor stators may function to move one or more rotors. The motor stator may be located within a primary roller. Representatively, the motor stator is a housing of the motor that is connected to the frame. The motor stator may include one or more magnets, one or more motor windings, or both. The motor stator may be powered to move the motor rotor by powering one or more windings of the motor stator. The one or more windings may be coiled or otherwise wrapped around the stator hub and receive power to form the rotor or stator. The one or more windings may be copper, nickel, silver, silver coated copper, a conductive metal, or a combination thereof. The windings may be in the form of a continuous wire, coils, or separate wires interconnected. The motor stator may be free of contact with the magnets, the rotor, or both. The motor stator may assist in moving a motor rotor so that the motor rotates a primary roller or rotates a roller tube. Representatively, the motor stator is located on an outside of the motor, in contact with a housing, around a motor shaft, around a rotor, or a combination thereof and the one or more magnets, rotor, or both extend inside the motor stator. The motor rotor, a plurality of magnets, or both, may extend around and/or inside of the motor stator, the stator hub, or both.

The stator hub may connect the motor windings to the housing, the stator, or both. The stator hub may receive the windings so that the windings, when powered, may move the rotor. The stator hub may extend along an inside of the housing. The stator hub may be powered. The stator hub may be located opposite magnets.

The one or more of magnets may function to rotate the rotor when the motor windings are powered. The one or more magnets may be a solid permanent ring magnet. The one or more ring magnets may be a single ring magnet. The one or more magnets may be a plurality of magnets. The ring magnet may be a segmented ring magnet. The plurality of magnets may extend around an inside of the motor rotor (e.g., housing). The magnets may be made of or include a ferrous metal, neodymium, iron, boron, samarium, cobalt, rare earth metals. The one or more magnets may be connected to the motor rotor. The one or more magnets may form a portion of the rotor. The ends of the magnets may be complementary to each other. The one or more magnets may be connected (e.g., arc shape connected) to form one or more ring magnets by an adhesive or connection mechanism.

The roller tube may function to support an article, move an article, or both. The roller tube may be a rotor. The roller tube may be an only portion of the roller that moves. The roller tube may be connected to the roller shaft by one or more bearings (e.g., supported by the bearings but rotationally movable relative to the roller shaft). The roller tube may be rotated by a motor. Representatively, the roller tube is round (i.e., has a circular cross-section), and an interior surface of the roller tube mates with an exterior surface (e.g., outer circumference) of the one or more magnets to form a motor rotor surrounding the motor stator.

The motor rotor may function to move one or more rollers. The motor rotor may be connected to the motor shaft through bearings. The motor rotor may surround the motor stator, rotate about the motor stator, or both. The motor rotor may be a plurality of magnets that function to rotate the motor shaft. The motor rotor may be rotated by the motor stator, the windings, or both. The motor rotor may be rotated by the magnets when the motor windings are powered. The motor rotor may include a hub that is connected to the motor shaft through bearings. The one or more motor windings may be wound around the hub.

The one or more motor windings function to rotate the rotor when the motor windings are powered. The one or more motor windings may move the magnets when the motor windings are powered. The motor may include a plurality of motor windings. The windings may be wrapped around a stator hub. The motor windings may be located inward of the magnets (i.e., the magnets may extend around the motor windings). The motor windings may be surrounded by the one or more magnets, the roller tube, or both. The motor windings may not be sealed. Representatively, the motor windings are encapsulated, sealed, or both. The motor windings may be located within the motor housing to rotate the motor rotor resting on the motor shaft by one or more bearings.

The one or more bearings may function to support one or both ends of the motor shaft as the motor shaft is rotated. The one or more bearings function to permit relative movement between the rotor and the stator. The one or more bearings may be connected to a frame. The one or more bearings may be free of contact with the frame. The one or more bearings may allow the rotor to rotate about an axis. The one or more bearings may be located within a housing of the motor. The one or more bearings may be press fit into the housing. The bearings may be sealed. The bearings may be encased in a hydrophobic material (e.g., grease). The bearings may restrict movement of fluid into the motor. The one or more bearings may be located between two seals. The one or more bearings may be only located on one side of the motor. For example, two bearings may be located on a side of the motor that the motor shaft extends out of. The bearings may be located at opposing sides of the motor. For example, a bearing may be located at each side of the motor. The bearings may be located at a closed end, open end, or both of the motor. The bearings may be connected to the end cap, the housing, or both. The housing, the end cap, or both may lock the bearings within the motor.

The housing of the motor may function as the stator. The housing may connect the motor to a frame. The housing may prevent movement of the motor. The housing may restrict movement of the bearings. The housing may include one or more open sides through which a motor shaft extends. A roller shaft, the motor shaft, or both may extend through the housing. The housing may be waterproof where openings are not present. For example, the material of the housing may prevent fluid from entering the motor. The housing may be one monolithic piece. The housing may be multiple pieces connected together.

The housing may include one or more end caps. The one or more end caps may function to permit maintenance of the motor. The one or more end caps may permit access to internal components of the motor. The one or more end caps may be sealed with the housing. The one or more end caps may be sealed with a seal, a sealant, or both. A seal, a sealant, or both may be located between the one or more end caps and the housing. The sealant may prevent fluids from extending into the motor from a location between the housing and the one or more end caps. The one or more end caps may hold one or more bearings. The one or more end caps may include a through hole. A shaft may extend through the one or more end caps. The one or more end caps and the housing may have a threaded engagement. The one or more end caps and the housing may each be sealed by one or more seals, sealants, or both where the end cap and the housing are connected, the shaft extends through the one or more end caps, the shaft extends through the housing, or a combination thereof.

The one or more seals may prevent fluid from passing into the rotor, the motor, between the housing and the end cap, or a combination thereof. The one or more seals may prevent fluid from passing into the motor along the shaft. The one or more seals may be a lubricated seal. The one or more seals may retain lubricant within the motor. The one or more seals may be located on an inboard side, outboard side, or both of the bearings. Representatively, the seals are located on an inboard side of the bearings and prevent fluid from passing the bearings. The one or more seals may retain lubricant and prevent fluids from entering the motor, rotor, bearings, or a combination thereof. The one or more seals may be a sealant. The one or more seals, sealants, or both may be made of a material that may be lubricated by an oil based product. The one or more seals may be lubricated by a bearing grease. The one or more seals, one or more sealants, or both may be made of nitrile, polyurethane, fluorinated ethylene propylene, polyacrylate, silicone, fluorosilicone, FKM Fluorocarbon, carboxilated nitrile, alternating polymers of tetrafluoroethylene and propylene (e.g., AFLAS®), FFMK perfuoroelastomer (e.g., SIMRIZ®); an O-ring, a gasket, or a combination thereof. The one or more seals may be located on an inboard side of the bearings and fluid seals, seals, sealants, or both may be located on an outboard side of the bearings.

The sealant may prevent fluid from entering the motor along the shaft, through an opening in the housing, an opening in the one or more end caps, or a combination thereof. The sealant and the seals may be made of the same material. The sealant may extend along the shaft into a location proximate to a notch in the shaft. The sealant may wipe fluid from the shaft, the notch, or both. The sealant, fluid seals, or both may have a compression fit on the shaft. The sealant may have a flare that extends axially along the shaft to prevent fluid exiting the notch from entering the motor. The sealant may assist in retaining a hydrophobic material within the motor. The sealant, the guard, or both may prevent fluid from entering the motor, contacting the hydrophobic material, or both.

The guard functions to cover an opening in the housing, the end cap, or both that the shaft extends through. The guard may be annular. The guard may prevent an opening in the housing, the end cap, or both from being directly contacted. For example, the guard may prevent fluid from being sprayed directly down the shaft into the motor. The guard may fit around the shaft and allow the shaft to rotate while preventing water from being sprayed into, dripping into, or both, the motor. The guard may function to retain a hydrophobic material. The guard may create a gap that may be filled with a hydrophobic material and the guard may prevent a stream of fluid from directly contacting the hydrophobic material. The guard may be or include metal, plastic, a polymer, rubber, an elastomer, silicone, stainless steel, carbon steel, or a combination thereof. The guard may be made of a material that is softer than the shaft so that the guard may wear before the shaft and the guard can be replaced. The guard may hold the hydrophobic material in place.

The hydrophobic material may function to fill a gap so that fluids cannot enter the motor, the gap, or both. The hydrophobic material may have a sufficient viscosity so that the hydrophobic material is prevented from being washed out of the motor. The hydrophobic material may have a viscosity that prevents gravity from causing the hydrophobic material from flowing. The hydrophobic material may resist being removed by fluid spray. The hydrophobic material may be grease, a food grade grease, an oil, a solid grease, a marine grade grease, a lithium based grease, a waterproof grease, or a combination thereof. The hydrophobic material may extend beyond an interior of the housing, the end cap, or both so that fluid cannot extend into the motor without displacing the hydrophobic material.

Figure 1:
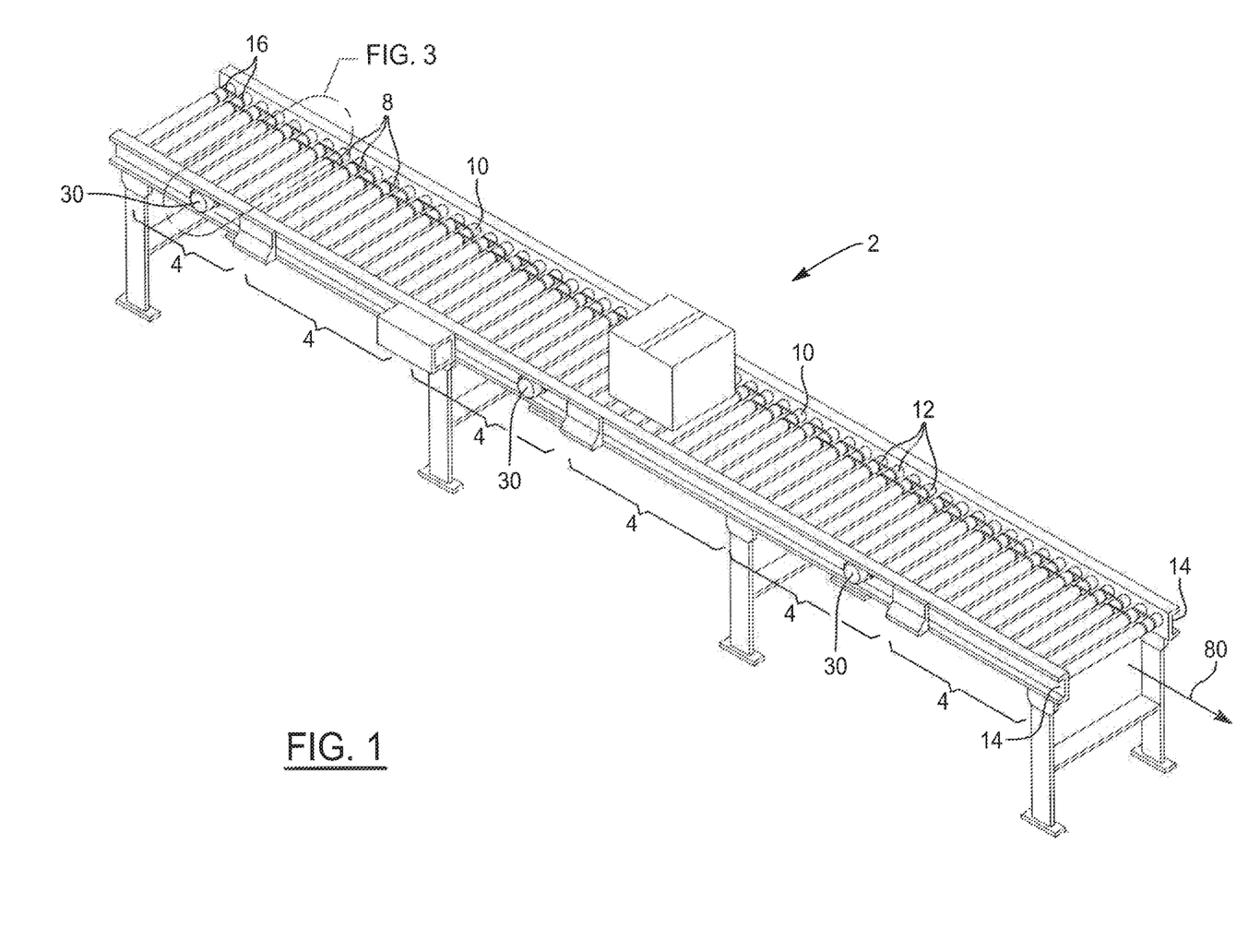
FIG. 1 is an isometric view of a representative application, in the form of a conveyor system, in which a motor in accordance with the present teachings may be employed.

FIG. 1 illustrates a representative application in which a motor in accordance with the present teachings may be employed. As shown in FIG. 1, a conveyor system 2 includes a plurality of rollers 8 located between two frame members 14. The rollers 8 include primary rollers 10 that are directly driven by a motor 30 in accordance with the present teachings, and the primary rollers 10 are connected to secondary rollers 12 so that the secondary rollers 12 are driven by the primary rollers 10. The motor 30 is located adjacent to the primary roller 10 to rotate the primary roller 10 and subsequently the secondary rollers 12 via transfer devices 16, which may be belts in a manner as is known. The conveyor system 2 includes a plurality of zones 4 with a primary roller 10 in the center of each zone 4 so that secondary rollers 12 are located on each side of the primary rollers 10. The primary rollers 10 move the secondary rollers 12 in the direction 80 via one or more of the transfer devices 16. While FIG. 1 illustrates the motor 30 being employed in a conveyor system application, it is understood that this is but a representative application in which the motor 30 may be employed and that motor 30 may not in any application in which it is desired to impart very much into a member or component.

Figure 2:
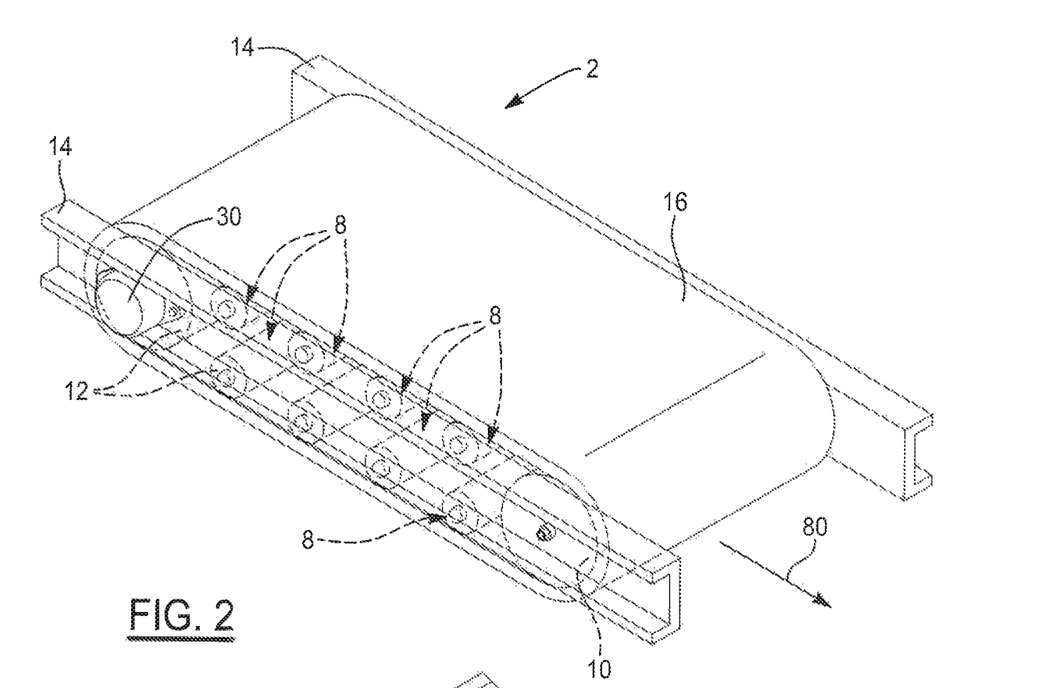
FIG. 2 is an enlarged partial top isometric view showing a portion of the conveyor system of FIG. 1 and a motor in accordance with the present teachings.

FIG. 2 illustrates the conveyor system 2 with a plurality of rollers. The plurality of rollers include the primary roller 10 and the secondary rollers 12, which are driveably interconnected via transfer devices 16 that wrap about the rollers 10, 12. The primary roller 10 is connected to the motor 30 that directly drives the primary roller 10, and the primary roller 10 drives the secondary rollers 12 in a direction 80 via the transfer devices 16.

Figure 3:
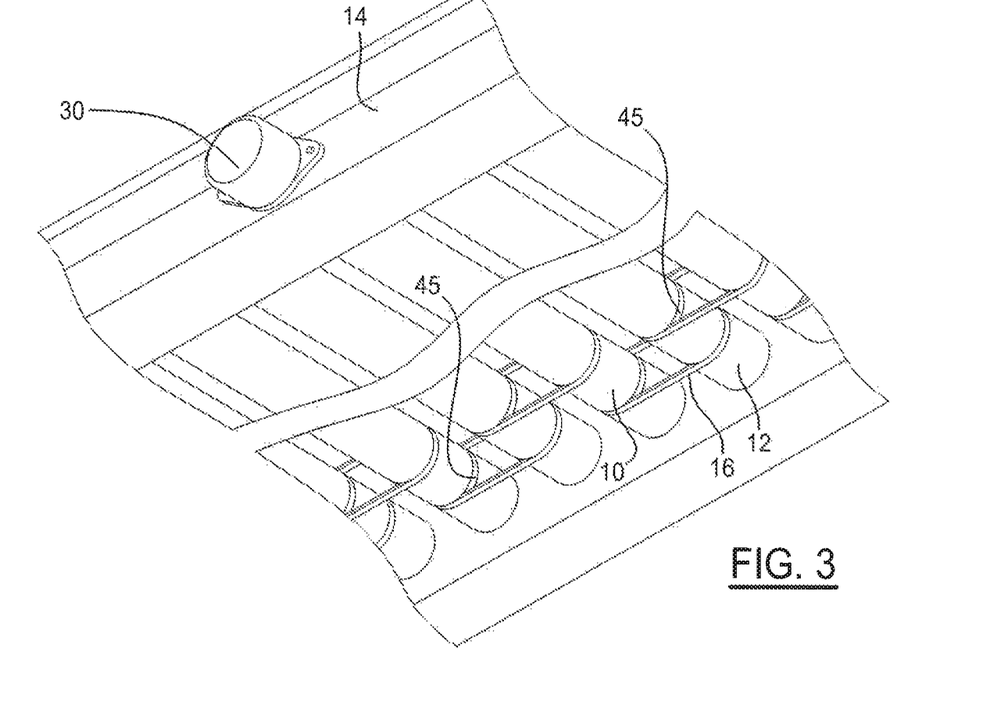
FIG. 3 is an enlarged partial bottom isometric view showing a portion of the conveyor system of FIG. 1 and a motor in accordance with the present teachings.

FIG. 3 illustrates a close-up view of a primary roller 10 connected to a frame 14. The frame 14 includes two sides that the primary roller 10 and the secondary rollers 12 span between. The primary roller 10 and the secondary rollers 12 are driven by transfer devices 16 that extend between grooves 45 of the primary roller 10 and the secondary rollers 12, and also extend between grooves 45 of the secondary rollers 12.

Figure 4:
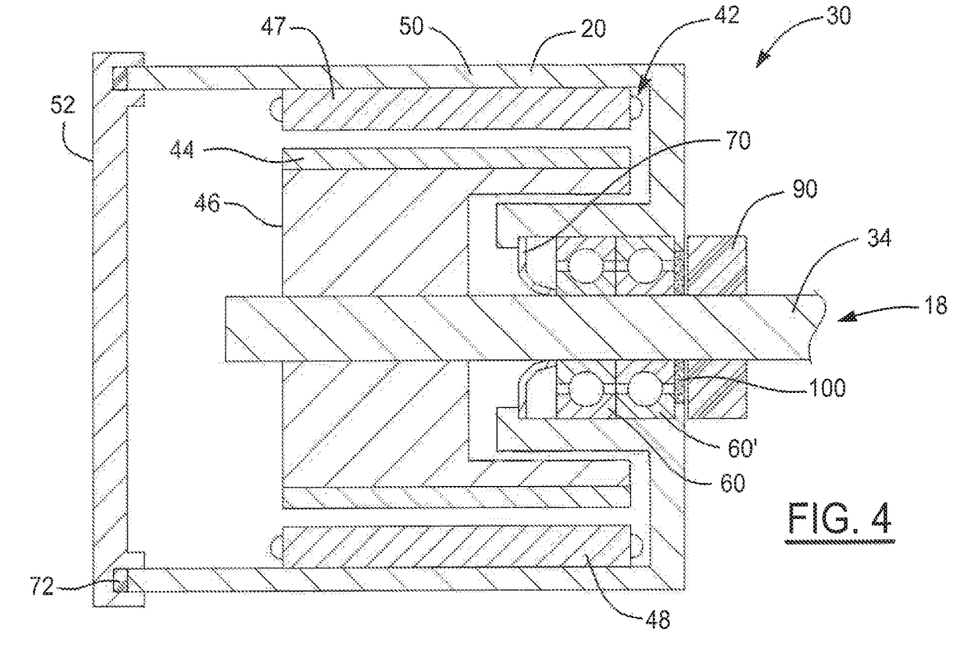
FIG. 4 is a cross-sectional view of a motor in accordance with the present teachings.

FIG. 4 illustrates a cross-sectional view of the motor 30 in accordance with the present teachings. The motor 30 includes a motor stator 42 mounted to a shaft 18 that may be a hollow motor shaft 34, and the motor shaft 34 is surrounded by a motor rotor 46. The motor 30 includes a motor housing 50 and an end cap 52. The motor housing 50 encompasses a magnet 44. The motor stator 42 includes a plurality of motor windings 48 wrapped around a stator hub 47. The shaft 18 is fed through bearings 60, 60' and encased so that the shaft 18 rotates relative to the frame (not shown) when the motor rotor 46 rotates. An internal side of the bearings 60, 60' includes a seal 70 that extends around the shaft 18. An external side of the bearings 60, 60' is covered by a guard 90 that prevents fluid from entering the motor 30. A hydrophobic material 100 is located between the guard 90 and the bearings 60, 60' to prevent fluid from entering the motor 30. Seal 70 seals the motor 30 between the motor housing 50 and end cap 52.

Figure 5:
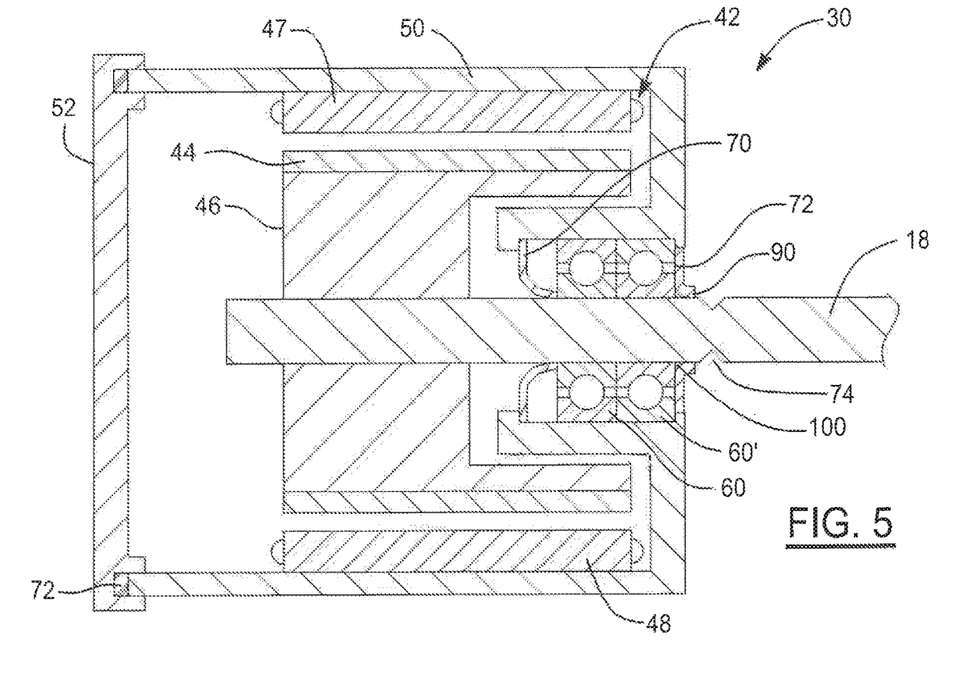
FIG. 5 is a cross-sectional view of a motor in accordance with the present teachings.

FIG. 5 illustrates a cross-sectional view of another embodiment of the motor 30. In this embodiment, the motor 30 includes a motor stator 42 mounted to a shaft 18 that is surrounded by a motor rotor 46. The motor includes the housing 50 including an end cap 52. The motor housing 50 encompasses a magnet 44. The motor stator 42 includes a plurality of motor windings 48 wrapped around a stator hub 47. The shaft 18 is fed through bearings 60, 60' and encased so that the shaft 18 rotates relative to the frame (not shown) when the motor rotor 46 rotates. An internal side of the bearings 60, 60' includes a seal 70 that extends around the shaft 18. An external side of the bearings 60, 60' is covered by a sealant 72. Any area of the sealant 72 that includes gaps is filled with a hydrophobic material 100 that prevents fluid from entering the motor 30. The shaft 18 includes a notch 74 that prevents fluid from moving down the shaft 18 into the motor 30. The sealant 72 includes flared ends that curve axially along the shaft 18 towards the notch 74 so that fluid exiting the notch 74 is removed by the flared ends. Seal 70 seals the motor 30 between the motor housing 50, and end cap 52.

Figure 6:
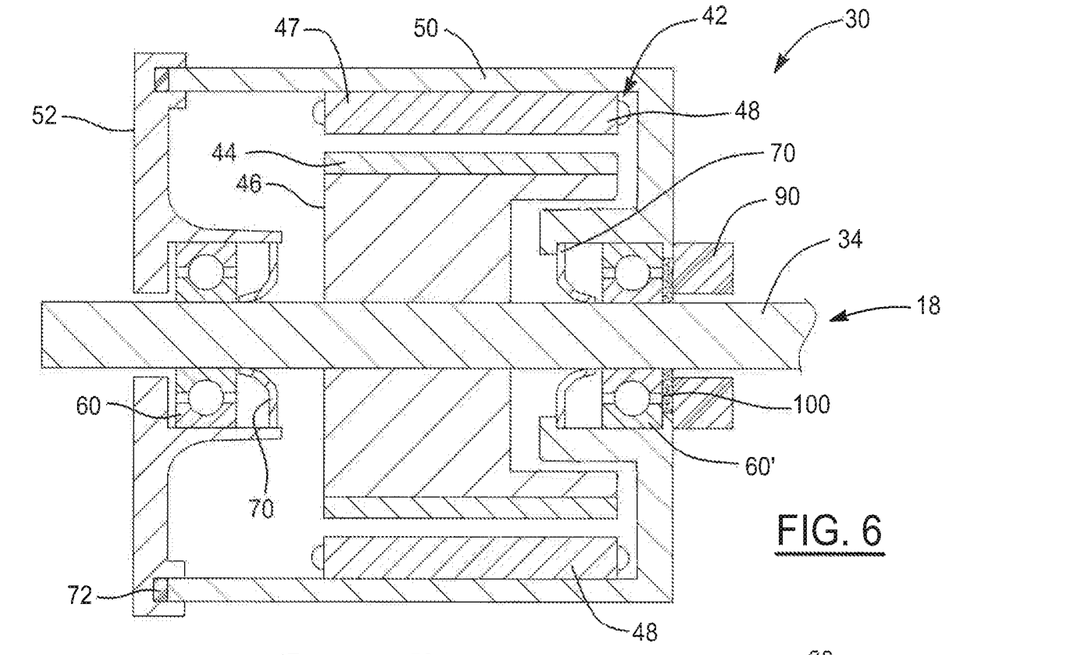
FIG. 6 is a cross-sectional view of a motor in accordance with the present teachings.

FIG. 6 illustrates a cross-sectional view of another embodiment of the motor 30. In this embodiment, the motor 30 includes a motor stator 42 mounted to a shaft 18 that is surrounded by a motor rotor 46. The motor includes a housing 50 and an end cap 52. The motor housing 50 encompasses a magnet 44. The motor stator 42 includes a plurality of motor windings 48 wrapped around a stator hub 47. The shaft 18 is fed through a bearing 60 on a first end and a bearing 60' on a second end so that the bearings 60, 60' support the shaft 18. The bearings 60, 60' hold the shaft 18 so that the shaft 18 rotates relative to the frame (not shown) when the motor rotor 46 rotates. The bearing 60 on the first side includes seal 70 located on an inside thereof. The bearing 60' on the second side include a seal 70 on an inboard side and a guard 90 on an outboard side. A hydrophobic material 100 is located between the guard 90 to prevent fluid from entering the motor 30. Seal 70 seals the motor 30 between the motor housing 50 and end cap 52.

Figure 7:
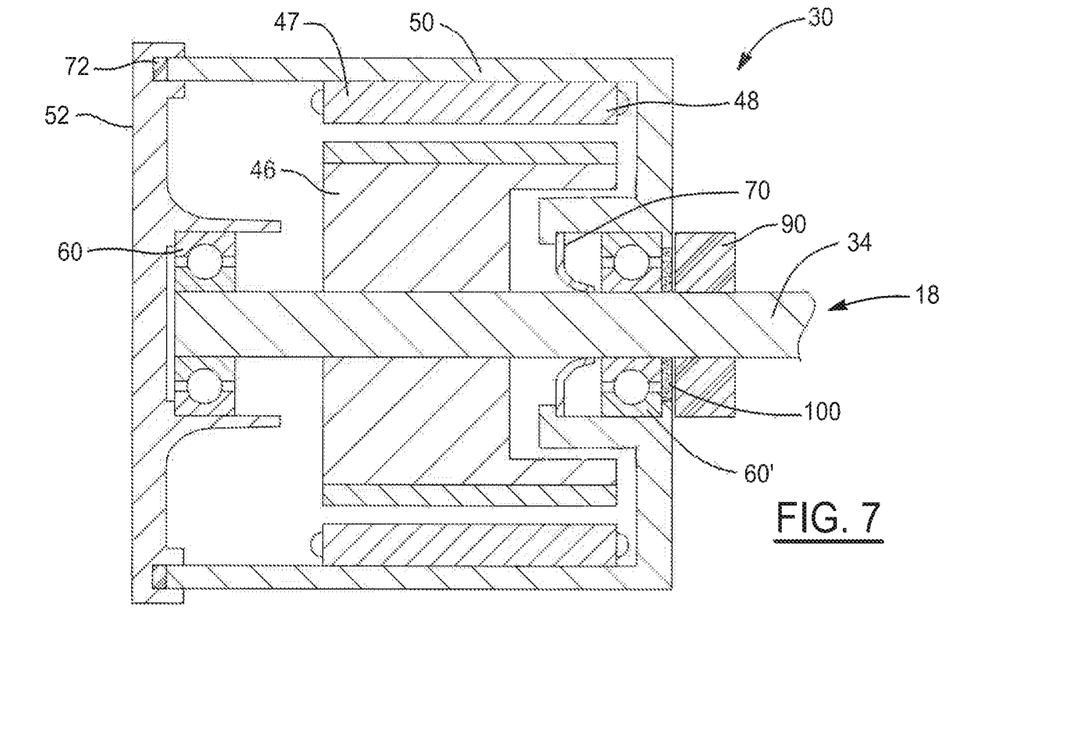
FIG. 7 is a cross-sectional view of a motor in accordance with the present teachings.

FIG. 7 illustrates a cross-sectional view of another embodiment of the motor 30 with one closed end and one open end. The closed end is closed by an end cap 52 connected to a motor housing 50. The end cap 52 holds a bearing 60. The bearing 60 supports an end of the shaft 18. The shaft 18 extends from the closed end of the motor 30 through the motor rotor 46 and out the open end of the motor 30. The open end of the motor 30 includes a bearing 60' connected to the shaft 18. The bearing 60' is located between a seal 70 and a guard 90. A gap between the bearing 60' and the guard 90 is filled with a hydrophobic material 100 that prevents fluid from entering the motor 30. Seal 70 seals the motor 30 between the motor housing 50 and end cap 52.

As noted previously, the motor 30 in accordance with the present teachings may be used in any application in which it is desired to impart rotation to a component, and use of the motor in a conveyor system is shown and described. Other possible applications for the motor 30 include, but are not limited to, use in a pool pump, a well pump, an air conditioner compressor, outdoor equipment such as a lawnmower, blower, etc., on board in a marine application, offboard in a submersible application, equipment in indoor environments subject to washdown such as in food processing, etc.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

2 Conveyor system
4 Zone
8 Rollers
10 Primary Roller
12 Secondary Roller
14 Frame
16 Transfer Device
18 Shaft
30 Motor
34 Motor Shaft
42 Motor stator
44 Magnet
46 Motor Rotor
47 Stator hub
48 Motor windings
50 Motor housing
52 End cap
60 Bearing
70 Seal
72 Sealant
74 Notch
80 Direction of movement
90 Guard
100 Hydrophobic Material

I claim:

1. A motor comprising:
  a. a motor housing;
  b. one or more motor stators including a plurality of motor windings;
  c. a shaft connected to the one or more motor stators, the shaft extending along a longitudinal axis of the motor; and
  d. a motor rotor including:
    i. a rotor;
    ii. one or more magnets located within the rotor or motor windings located within the rotor;
  e. one or more bearings located between the motor housing and the shaft so that the motor housing and the shaft are movable relative to each other, wherein a first one of the one or more bearings comprises:
    i. an interior side that faces an interior of the motor;
    ii. an exterior side that faces a location outside of the motor, wherein all or a portion of the exterior side is free of being covered by the motor housing;
    iii. a hydrophobic material filling a gap created by a region located exteriorly of the exterior side of the first bearing that is free of being covered by the motor housing, wherein the hydrophobic material contacts the exterior side of the first bearing; and
  f. a shaft seal located interiorly of the interior side of the first bearing.

2. The of claim 1, wherein the motor housing is stationary and holds the one or more motor stators.

3. The motor of claim 1, further comprising a guard, wherein the shaft extends through all or a portion of the guard and the guard is located exteriorly of the exterior side of the first bearing.

4. The motor of claim 3, wherein the gap is located between the exterior side of the first bearing and the guard, and wherein the hydrophobic material is located within the gap between the exterior side of the first bearing and the guard.

5. The motor of claim 4, wherein the hydrophobic material is a grease.

6. The motor of claim 5, wherein the guard is connected to the motor housing.

7. The motor of claim 3, wherein the guard is removable.

8. The motor of claim 1, wherein the one or more bearings are two bearings.

9. The motor of claim 8, wherein the two bearings are located next to each other with or without a spacer located between the two bearings.

10. The motor of claim 1, wherein the motor housing includes an end cap.

11. The motor of claim 10, wherein the end cap is a monolithic part of the motor housing.

12. The motor of claim 10, wherein the end cap is connected to the motor housing and a seal is located between the end cap and the motor housing.

13. The motor of claim 1, wherein the shaft extends out of only a first side of the motor housing.

14. The motor of claim 1, wherein the shaft extends out of a first side and a second side of the motor housing.

15. The motor of claim 1, further comprising a groove in the shaft on an external side of the motor housing.

16. The motor of claim 15, wherein the motor includes a guard and the groove is on an external side of the guard.

17. The motor of claim 1, wherein the one or more bearings comprise triple sealed bearings, ceramic bearings, waterproof bearings, and/or anticorrosion bearings.

18. A motor comprising:
  a. a motor housing;
  b. one or more motor stators including a plurality of motor windings;

c. a shaft connected to the one or more motor stators, the shaft extending along a longitudinal axis of the motor; and
d. a motor rotor including:
   i. a rotor;
   ii. one or more magnets located within the rotor;
   iii. one or more bearings located between the motor housing and the shaft so that the motor housing and the shaft are movable relative to each other;
e. one or more guards located on an external side of the one or more bearings;
f. a shaft seal located on the interior side of one of the one or more bearings; and
g. a hydrophobic material located between the one or more bearings and the one or more guards to prevent fluid from entering the motor.

\* \* \* \* \*